(No Model.)
C. T. SHAFER.
Horse Rake.
No. 237,914. Patented Feb. 15, 1881.
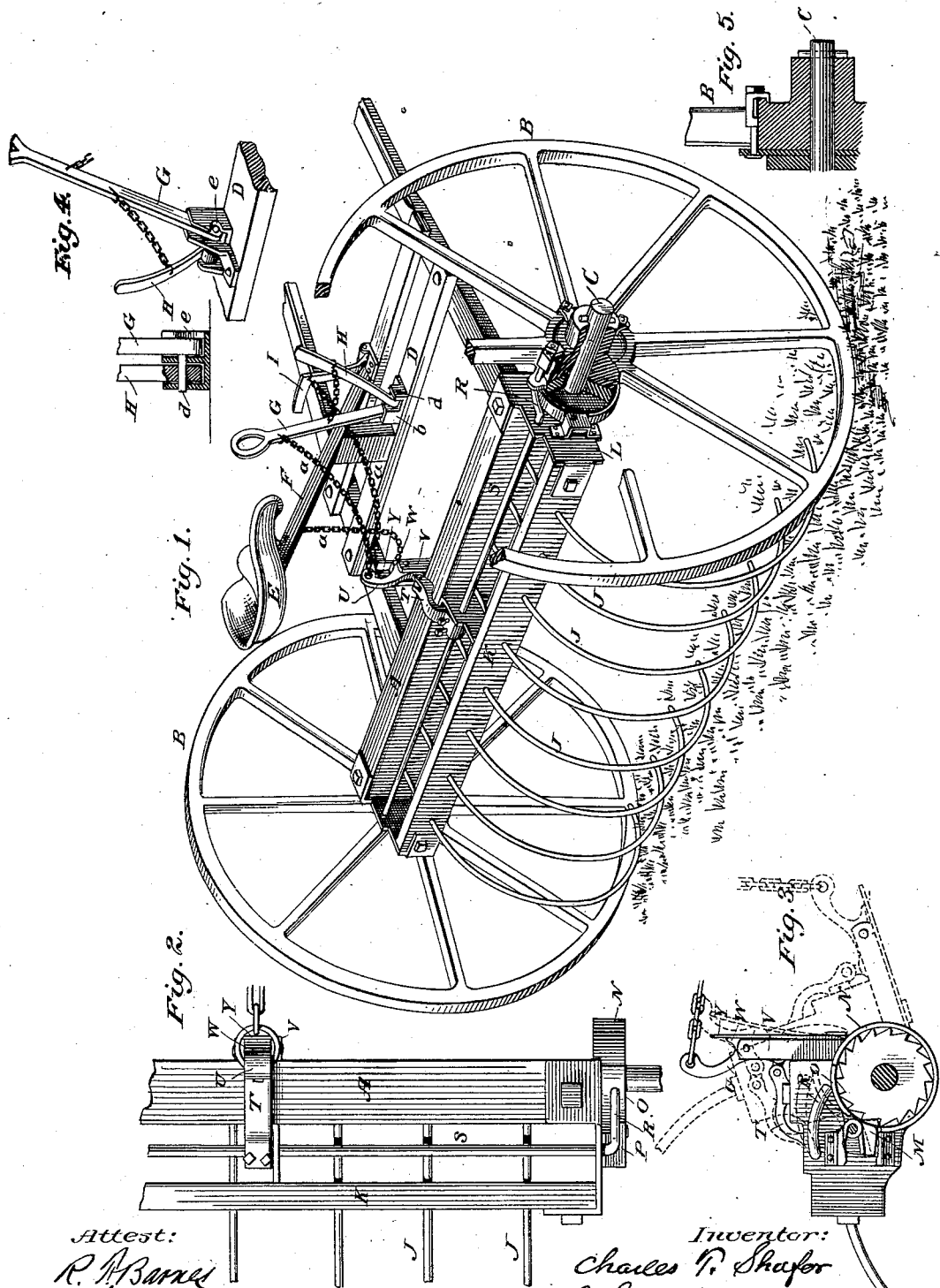

UNITED STATES PATENT OFFICE.

CHARLES T. SHAFER, OF SPRINGFIELD, OHIO.

HORSE-RAKE.

SPECIFICATION forming part of Letters Patent No. 237,914, dated February 15, 1881.

Application filed November 6, 1880. (No model.)

*To all whom it may concern:*

Be it known that I, CHARLES T. SHAFER, of Springfield, in the county of Clarke and State of Ohio, have invented a new and useful Improvement in Horse-Rakes; and I hereby declare that the following is a full and exact description of the same.

This rake belongs to that class of horse-rakes which are mounted upon wheels, and wherein the teeth are mounted in a rotating head which may be caused to engage with the bearing wheel or wheels to tilt the rake and discharge the load, and the features which I believe to be novel are as follows:

First, the tail of said pawl forms a part of circular and shield for the hub.

Second, the trip which forces the pawl into engagement is a self-locking toggle, and when once "set" to engage said pawl and wheel it can only release or trip said pawl by a positive exertion of power to that end.

Third, the pawl in its initial position is free from the mechanism which forces it into engagement, and is operated by a crank-rod connected with the toggle-trip.

Fourth, the toggle-trip is forced into action by a pull upon a chain which is attached to its free end, and is tripped by a pull in the opposite direction by the same chain when the rake-head has revolved past the stationary fastening for the other end of said chain.

Fifth, the chain which trips the toggle may be attached to the seat or to the operative lever.

Sixth, the toggle may be tripped by either hand or foot, a compound lever accessible to either being employed.

Seventh, the foot-piece is weighted or provided with a spring, so as to keep the hand-lever and trip-chain always in position ready for use.

Eighth, the joint between hand and foot lever is of peculiar structure, so that they may be disconnected from their seats without the use of tools.

Ninth, the ratchet upon the bearing-wheel is secured by bolts having peculiar detachable hook-heads.

That others may fully understand my invention, I will particularly describe it, having reference to the accompanying drawings, wherein—

Figure 1 is a perspective view of my rake. Fig. 2 is a plan of a part of the same. Fig. 3 is an end elevation. Figs. 4 and 5 are details.

A is the main axle or frame, and B B are the main wheels, which support said frame upon the axle C.

D is the shaft-frame, which is hinged at its rear end to the axle A, and at its front end it is supported by the horse, whereby the machine is propelled. The frame D also supports the driver's seat E upon the leg F and the operative levers G H I, whereby the rake may be caused to tilt and discharge its load.

The rake-teeth J are set in the axle A, and are supported in rear of the same by the rail K, which is attached to the axle A by brackets L or other proper supports. The curve of the teeth J is such that their points run upon the ground, and the accumulated grass loads them, without causing them to swing the supporting-axle so as to discharge said load. This is the usual arrangement. When a sufficient quantity has been gathered the teeth J are raised from the ground by swinging the axle A upon its bearings in the wheels, and the accumulated hay is discharged. This operation requires a positive exertion of power, and horse-rakes have heretofore been constructed to derive this power from the traction of the wheels and the force which propels the machine. My invention also derives this force from the power which propels the machine, and therefore I do not claim anything as to the general principles involved, but only as to the methods which I have devised to give these principles a practical application.

The joint between the inner end of the hub and the axle is protected by a sand-ring, N, one part of which is constituted by the tail O of the pawl M, which is curved in the arc of the circle of N for that purpose. A spring concealed in the housing P constantly presses upon the pawl M, and tends to throw it into engagement with the ratchet Q upon the wheel B; but the pawl is restrained and kept from engaging until the proper time by the crank R at the end of the rod S. The rod S turns in proper bearings attached to the frame, and is independent of the pawl M, except that the extremity of crank-arm R bears upon the tail O of the pawl and keeps said pawl out of engagement with the ratchet. The rod S at its inner end is connected with a lever, T, which, at its free end, is coupled or linked with a lever, U, whose pivotal center is in the post V. The lever U has on its front a projection, w, against which a spring, Y, is constantly pressing. When the lever U is in an upright position the direction of pressure of the spring W is above the pivot of said lever. It is therefore kept upright, and the free end of the lever T is kept depressed, and the crank-arm R of the rod S is also depressed upon the tail O of the pawl to keep it depressed also; but when a force is applied to the top of the lever U, so as to pull it over forward, the projection w is carried forward and downward so far that the direction of pressure by the spring Y is below the pivot-center before spoken of, and the lever U is held in that position. The free end of the lever T is then raised to a point which is above a right line, which connects the pivots of the levers T and U, and all pressure which is exerted in the direction of said line will tend to lock and retain said levers in their positions. When the lever U has been so pulled over forward the arm R is raised off the tail O of the pawl, and the latter is immediately thrown into engagement with rack, and the rack will be tipped.

The power to pull over the lever U is applied by means of the hand or foot in any proper way, and I have constructed the lever G, and connected it with said lever U by a chain or cord, a, so that by pulling or pushing said lever G over forward the lever U may be pulled over also. The lever G is a hand-lever, and is located at a convenient distance from the driver's seat E. It is not always convenient, however, for the driver to employ his hand for the manipulation of the lever G, and I have therefore coupled with said lever a foot-piece, H, so that either hand or foot may be employed to operate the lever U. The weight of the lever H is sufficient to keep the lever G drawn over forward and the chain a taut. If not sufficiently heavy for this purpose without additional weighting, it may be loaded at its outer end to the required degree. The foot and hand levers G H may be incorporated in one, if desired, or a foot-lever, like I, may be used alone, if preferred. The levers G and H are coupled in a peculiar manner. The socket-plate b is provided with two sockets for the two levers named, and a pivot-hole is drilled on the same line through both sockets. The outer plate of the socket for lever G is cut away at e, so that when said lever is thrown over forward to a certain position it may be withdrawn sidewise from its socket. The joint-pin d for levers G H is set permanently in the foot of the lever G, so said lever is inserted or withdrawn from its socket through the notch e. The lever or foot-piece H is placed in its socket in the usual way, and the pin d inserted when the lever G is inserted in its socket. A stud may be placed on the outer side of lever G to fit the notch e, if desired. The lever G can only assume the position for disengagement from its socket when the chain a has been uncoupled.

A positive exercise of force is required to pull the lever U over forward to cause an engagement of the pawl M and the ratchet, and it also requires a positive exercise of force to pull said lever U back to its initial position to disengage said pawl and permit the rake-teeth to descend upon the ground again. With the devices shown the same instrumentalities are employed to produce both movements. When the lever U has been pulled over forward by the chain a, said lever immediately begins to rotate with the frame A, and when it has so moved through an arc of, say, ninety degrees, the chain a again becomes taut and arrests the outer end of said lever U, and the toggle-joint between said lever and lever T is carried across the median line joining the two pivots of said levers, and the spring W immediately causes them to reassume their initial positions.

It is evident that the peculiar office of the toggle-levers T U does not depend upon the presence of foot or hand lever G, H, or I, and that the same effects may be produced in a less convenient way, perhaps, if the chain a is merely fastened to the seat or seat-leg, as shown, and the lever U is tripped by simply pulling said chain by hand.

Having described my invention, what I claim as new, and desire to secure by Letters Patent, is—

1. A ratchet and bearing-wheel with an engaging-pawl, M, combined with a sand-ring, N, and pawl-tail O, adapted to constitute a portion of said ring, as set forth.

2. The ratchet upon the bearing-wheel, and the pawl M, and the rods and crank R upon the frame, independent of said pawl, and engaging therewith by contact only, combined with the toggle-levers T U, to operate said rod, as set forth.

3. The levers T U, coupled as described, and pivoted upon the tilting rake-frame, combined with a projection, W, upon the lever U, and the spring Y, whereby said levers are held in position at either extremity of their movement.

4. The ratchet upon the bearing-wheel, and the engaging-pawl upon the tilting rake-frame, combined with the toggle trip-levers T U, coupled and pivoted substantially as described, and the trip-chain a, one end whereof is attached to said lever U, and the other end whereof is attached at some point convenient to the hand of the driver, so that the trip may be operated at will.

5. A tilting rake-frame which is caused to tilt by engagement with the bearing-wheel, and a toggle-trip substantially like levers T U, arranged to cause the pawl to engage with a motion of said trip in one direction and to disengage with a motion in the opposite direction, combined with a chain, a, or other proper connection, whereby the toggle may be moved at will in one direction, and be automatically moved in the other at the proper moment, as set forth.

6. A tilting rake-frame, A, and a trip mechanism mounted thereon, combined with a trip-lever, G, mounted upon the shaft-frame, and pivoted foot-piece H, connected to said hand-lever by a flexible connection, and weighted at its outer end, so as to keep taut the connection with the trip, as set forth.

7. The hand-lever G, provided with the pivot-pin $d$, combined with the foot-lever H, and the double socket $b$, provided with the notch $e$, substantially as and for the purpose set forth.

8. The ratchet-ring fitted to the hub of the wheel B, combined with fastening-bolts and loose hook-heads, whereby said ratchets may be attached to hubs of any description, as set forth.

CHAS. T. SHAFER.

Witnesses:
OSCAR T. MARTIN,
C. P. REMSBURG.